United States Patent Office 3,649,718
Patented Mar. 14, 1972

3,649,718
HALOGENATED PHENYL ALKYLENE
PHOSPHINATES
Eric Jungermann, Chicago, and Henry E. Reich, Wilmette,
Ill., assignors to Armour and Company, Chicago, Ill.
No Drawing. Filed Nov. 29, 1966, Ser. No. 597,526
Int. Cl. C07d 105/02; C11d 9/50
U.S. Cl. 260—936
4 Claims

ABSTRACT OF THE DISCLOSURE

Germicidal compounds having the formula

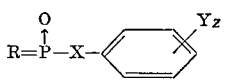

wherein
Y is chloride, bromide or iodide;
z is a positive integer from 1 to 3;
X is oxygen or sulfur and
R is a hydrocarbon radical containing from 6 to 12 carbon atoms.

---

This invention relates to antibacterial agents and more particularly to soap germicides.

In one specific aspect, the present invention relates to novel halogen substituted phenyl derivatives of phosphorylated 2,4,4-trimethyl-2-pentene that are useful as soap germicides.

Many compounds have in the past been investigated for antibacterial activity. While numerous substances have indicated a degree of effectiveness, few have produced the desired results necessary for soap germicides. In many cases antibacterial agents are inhibited in effectiveness when incorporated into soap and further, products such as toilet soap have the added requirement that the germicide must not be harmful to the human skin. It is commercially desirable that a considerable variety of germicides be made available from which a selection may be made for germicidal agents compatible with and useful in toilet soap.

Certain compounds of the class bisphenols, notably hexachlorophene, have been found to be remarkably effective soap germicides (U.S. Pat. No. 2,535,077). However, it seems to be generally conceded that blocking the hydroxyl group of phenols or bis-phenols markedly reduces their germicidal activity in soap. We have discovered that certain halogen substituted phenyl compounds wherein the hydroxy group is either blocked or not present are effective soap germicides.

It is therefore an object of this invention to provide a new substance for imparting germicidal activity to various products.

Another object of this invention is to provide a novel composition of matter having germicidal activity compatible with and useful in toilet soap.

A further object of the present invention is to provide a novel germicidal soap product.

These and other objects and advantages and a fuller understanding of the present invention will become more apparent from the ensuing detailed description and examples.

The new and useful germicidal agents of this invention have the general structural formula:

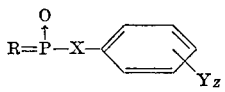

wherein
Y is a halogen radical selected from the group consisting of chloride, bromide and iodide;
z is a positive integer from 1 to 3 inclusive;
X is selected from the group consisting of oxygen, sulfur and nitrogen; and
R is a hydrocarbon radical containing from 6 to 12 carbon atoms.

R may be a straight or branch chain aliphatic or alicyclic radical.

Germicidal agents having the hereinabove structure may be generally prepared by a two-step synthesis involving, first, the conversion of an unsaturated aliphatic hydrocarbon to the corresponding phosphinic acid halide and, secondly, the reaction of the phosphinic acid halide with a salt of suitable halogen substituted phenyl compounds. Preparation of the phosphinic acid halide may be by the procedure of Jungermann et al., J. Org. Chem., 27, 606 (1962). For this preparation preferred starting materials include an unsaturated aliphatic hydrocarbon such as 1-hexene, 1-nonene, tetrapropylene, alpha-pinene, 1-dodecene, and 2,4,4-trimethyl-2-pentene to be reacted with a phosphorus halide compound such as phosphorus trichloride or phosphorus tribromide and a metallic halide such as aluminum chloride.

A preferred phosphinic acid halide for use in preparing germicidal agents of this invention is 1,1,2,3,3-pentamethyltrimethylenephosphinic acid chloride which may be obtained by the procedure of Jungermann et al., J. Org. Chem., 27, 1833 (1962), involving the reaction of 2,4,4-trimethyl - 2 - pentene with phosphorus trichloride and aluminum chloride.

Preferred germicidal agents of this invention synthesized with 1,1,2,3,3 - pentamethyltrimethylenephosphinic acid chloride are prepared by reacting the acid chloride with a metallic salt of suitable halogen substituted phenyls to yield phosphorus compounds having the general structure:

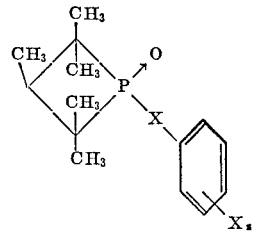

wherein Y, z and X are as hereinabove defined and a methylene radical appears at each of the three closed-corners of the alicyclic ring.

Suitable halogen substituted phenyl compounds for use in preparing germicidal agents of this invention may be prepared by known methods. The metallic salts thereof are obtained by reacting the halogenated derivative of phenol with a strong metal hydroxide; for example, a chlorophenol with potassium hydroxide solution to obtain the potassium chlorophenoxide salt.

Halogen substituted phenyl compounds especially suitable for use in preparing the preferred germicidal agents of this invention include:
p-chlorophenol
2,4-dichlorophenol
2,4,5-trichlorophenol
p-chlorothiophenol, and
3,4-dichloroaniline.

Relatively small amounts of the preferred germicidal agents are sufficient to obtain the advantages of this invention. Satisfactory results are obtained when the weight of the antibacterial agent is from 0.2% to 5% of the total weight of the soap composition. It should be understood that lesser or greater amounts will be effective, but without substantial advantages. The preferred range is a weight concentration in soap of about 0.5% to 1.5%.

The term "soap" refers to the water-soluble metallic, ammonium, or organic base salts of various fatty acids, such as lard, lauric, oleic, myristic palmitic and stearic acids. As used in this specification and claims, the term is intended to cover all products in which soap is a substantial constituent, for example, bar, flake, powdered, soft and liquid soaps; shaving creams, cleansing creams, and the like.

The germicidal agents of this invention can be added to the soap or other antiseptic composition by any suitable method which results in a uniform distribution of the antibacterial agent throughout the entire mass.

In order to more fully describe this invention, the following specific examples are provided without, however, limiting the present invention to the precise details set forth except as required by the appended claims.

EXAMPLE I

A phosphorus compound germicidal agent of the present invention was made by reacting pentamethylene-phosphinic acid chloride with the potassium phenoxide salt of 2,4-dichlorophenol using the following laboratory procedure:

The potassium phenoxide salt was prepared in a 1-liter, 3-neck round bottom flask equipped with a thermometer, a stirrer, a dropping funnel and a reflux condenser by the reaction of 5.6 grams (0.1 mole) of potassium hydroxide dissolved in 100 ml. of methanol with 16.3 grams (0.1 mole) of 2,4-dichlorophenol dissolved in 200 ml. of methanol.

The resulting potassium phenoxide salt was heated to 45° C. and 19.5 grams (0.1 mole) of pentamethyltrimethylenephosphinic acid chloride (prepared from 2,4,4-trimethyl-2-pentene by the method of Jungermann et al., supra), dissolved in 50 ml. of methanol, was added dropwise with stirring to the mixture in the flask. The dropwise addition proceeded over a period of about twenty minutes. Then the mixture was heated to reflux for one-half hour, cooled over-night and filtered to remove the precipitated potassium chloride salt. The precipitate was discarded and the resulting liquid was concentrated to an oil; about 100 ml. of warm methylene chloride was added, and the oil was washed a couple of times with water and separated. The separated light colored oil was allowed to stand and gradually crystallized to a white solid having a melting point of 90–91° C. and containing 22.5% chlorine (theory 22.1%). Germicidal activity of the product was determined as reported in Table I.

EXAMPLE II

The procedure set forth in Example I was repeated using 2,4,5-trichlorophenol in place of and in an amount stoichiometrically equivalent to the 2,4-dichlorophenol specified in Example I.

The purified product of this example was a solid exhibiting a melting point of 103–105° C. and containing 31.8% chlorine (theory 32.8%). Germicidal activity of this product was determined as reported in Table I.

EXAMPLE III

Using the procedure of Example I, a stoichiometrically equivalent amount of p-chlorophenol was substituted for the 2,4-dichlorophenol specified in Example I.

The purified product obtained was a light colored oil having a germicidal activity as reported in Table I.

EXAMPLE IV

The procedure set forth in Example I was repeated using a stoichiometrically equivalent amount of p-chlorothiophenol in place of the 2,4-dichlorophenol specified in Example I.

The resulting product of this example was a light colored solid exhibiting a melting point of 97–99° C., containing 12.0% chlorine (theory 11.8%), and having germicidal activity as set forth in Table I.

EXAMPLE V

The 3,4-dichloroaniline derivative of the phosphinic acid chloride was prepared generally following the procedure of Example I with the following particulars:

To 10.3 grams (0.055 mole) of the phosphinic acid chloride, pentamethyltrimethylenephosphinic acid chloride, was added 8.6 grams (0.055 mole) of 3,4-dichloroaniline dissolved in 100 ml. of benzene. The mixture was refluxed for three hours, cooled and washed with water. The organic layer of the mixture was separated and concentrated to yield 16.7 grams of an amber oil having the germicidal activity determined by the procedure hereinbelow with the germicidal activity results set out in Table I.

Bacteriostatic activity for the hereinabove prepared derivatives of phosphorylated 2,4,4-trimethyl-2-pentene was determined by both a modified agar streak method utilizing a 10% soap solution, 100,000 p.p.m. basis soap containing the agents to be tested and a tube dilution technique in which soap was absent. The "soap" utilized was a neutral white toilet soap containing about 20% by weight sodium coco soap and 80% by weight sodium tallow soap.

For the agar streak dilution method, serial dilutions were made containing 10,000 p.p.m. and 1,000 p.p.m. soap solution containing 100 p.p.m. and 10 p.p.m. of the bacteriostat respectively. All solutions were maintained at 60° C. until they were dispensed.

Aliquot amounts of the test soap solution were thoroughly dispersed into measured amounts of nutrient agar at 50° C. at concentrations ranging from .05 to 20 p.p.m. of the agents to be tested.

Plates were poured, allowed to solidify and streaked with a standard 4 mm. loopful of a 24-hour broth culture of *Staphylococcus aureus* FDA 209. After incubation for 24 hours at 37° C. the bacteriostatic end-point was determined. The bacteriostatic end-point, hereinafter called the minimum inhibitory concentration (MIC), represents the minimum concentration in p.p.m. of the bacteriostatic agent necessary to inhibit all growth of the inoculated organism.

The tube dilution test was performed by making serial dilution of the bacteriostatic agent in nutrient broth ranging from 0.01 to 100 p.p.m. of the agent. The tubes containing nutrient broth plus the bacteriostat were inoculated with 0.05 ml. of a 24-hour broth culture of *S. aureus* FDA 209 and incubated at 37° C. for 24 hours. The MIC was then determined.

A soap may be termed "antibacterial" if it is effective in killing or inhibiting the growth of the *Staphylococcus aureus* organism whether or not it happens to be effective against any other type of bacteria. No particular minimum inhibitory concentration has been established to determine the usefulness of a germicidal agent, although at the lower endpoints smaller amounts of agent will be necesary to produce a particular effect.

The minimum inhibitory concentration endpoints for the halogen substituted phenyl derivatives prepared in Examples I through V are set forth in Table I:

TABLE I

| | Minimum inhibitory concentration (p.p.m.) | |
|---|---|---|
| | Broth | Soap |
| Halogenated derivative of phosphorylated 2,4,4-trimethyl-2-pentene and— | | |
| Example I: 2,4-dichlorophenol | 100 | 20 |
| Example II: 2,4,5-trichlorophenol | | 20 |
| Example III: p-chlorophenol | 100 | 15 |
| Example IV: p-chlorothiophenol | 100 | 20 |
| Example V: 3,4-dichloroaniline | 100 | 15 |
| Standard (hexachlorophene) | 0.01 | 0.5 |
| "Soap" without added agent | | 3,000 |

From the results given in Table I above, it will be observed that the standard, hexachlorophene, had a MIC of 0.5 p.p.m. in soap—that is, no growth of *S. aureus* 209 was observed in the agar plate containing 0.5 p.p.m. of hexachlorophene in soap. It will also be observed from the results in Table I above that the test compounds did exhibit bacteriostatic action and, more remarkably, exhibited increased bacteriostatic action in the soap.

While this invention has been described in terms of its preferred embodiments, those skilled in the art will appreciate that variations can be made without departing from the scope and spirit of the invention.

We claim:

1. Compounds having the formula:

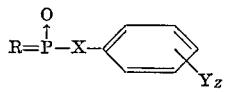

wherein

Y is a halogen radical selected from the group consisting of chloride, bromide and iodide;

$z$ is a positive integer from 1 to 3 inclusive;

X is selected from the group consisting of oxygen and sulfur; and

R is a saurated alkylene radical containing from 6–12 carbon atoms having methyl substituents.

2. A compound as set forth in claim 1 wherein R is 1,1,2,3,3-pentamethyltrimethylene.

3. The compound of claim 2 wherein X is oxygen and Y is chloride.

4. The compound of claim 2 wherein X is sulfur and Y is chloride.

References Cited

UNITED STATES PATENTS 2,520,393   8/1950   Fletcher _____ 260—973 X

ALEX MAZEL, Primary Examiner

A. H. SUTTO, Assistant Examiner

U.S. Cl. X.R.

260—551 P, 973, 999; 252—107